April 4, 1950
L. B. NEIGHBOUR ET AL
2,503,128
HARVESTER ROLL
Filed March 17, 1947
2 Sheets-Sheet 2
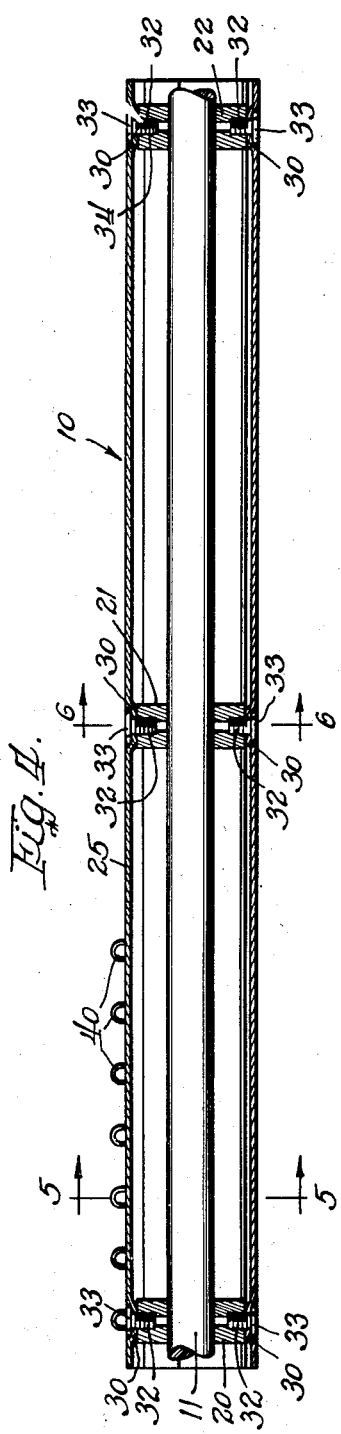
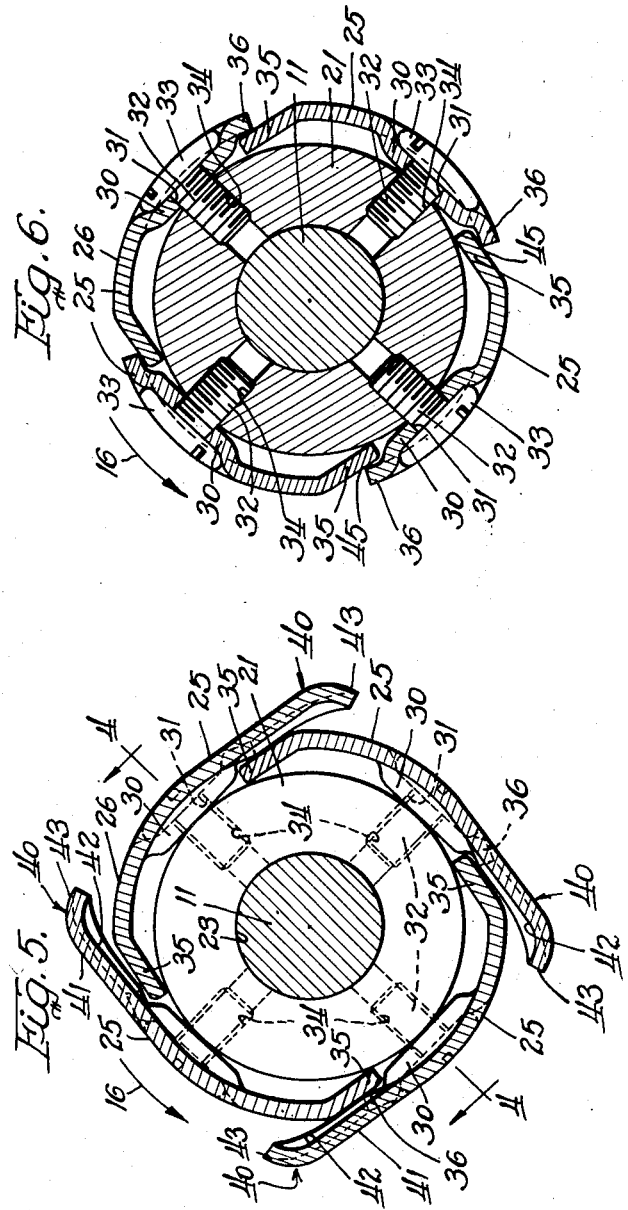
Inventors
Leonard B. Neighbour,
Merrill W. Roscoe.

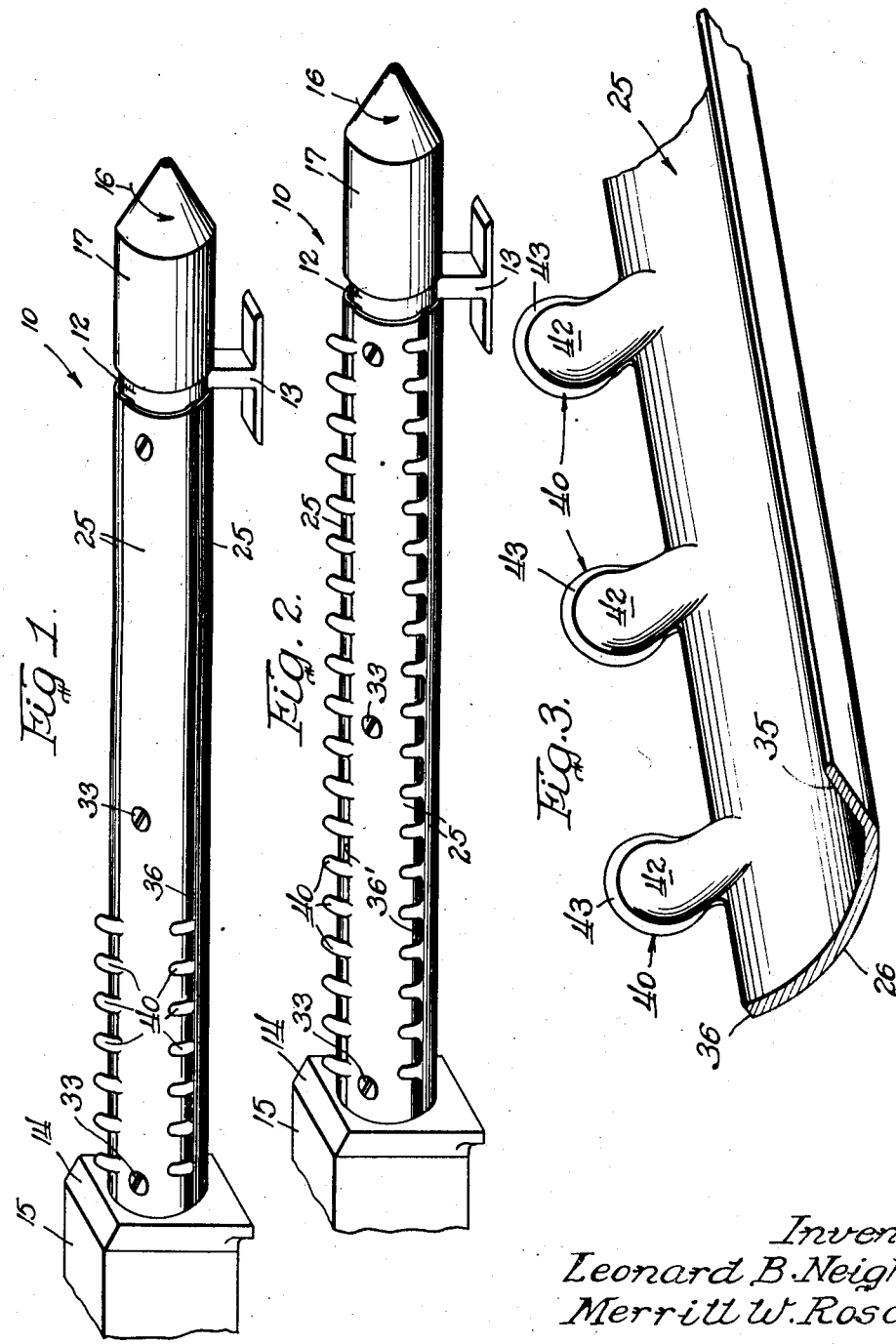

Patented Apr. 4, 1950

2,503,128

UNITED STATES PATENT OFFICE 2,503,128

HARVESTER ROLL

Leonard B. Neighbour and Merrill W. Roscoe, Moline, Ill., assignors to Deere & Company, Moline, Ill., a corporation of Illinois Application March 17, 1947, Serial No. 735,188

10 Claims. (Cl. 56—50)

The present invention relates generally to harvester rolls and more particularly to rolls of the type used in cotton harvesters of the stripper type for the purpose of disengaging bolls of cotton from cotton plants in the field. It is understood, however, that our invention is not necessarily limited to cotton stripper rolls, for the principles of this invention may be applied to other types of harvester rolls, such as, for example, snapping and husking rolls used in corn harvesters.

The principal object of our invention relates to the provision of a harvester roll which is lighter in weight and less expensive to manufacture than rolls heretofore known to those skilled in the art, without a decrease in strength, serviceability, or efficiency.

It is well known to those skilled in the art that different types of cotton require different types of treatment in stripping the cotton bolls from the plants during harvest. For example, in "stormproof" cotton, the lint is more or less confined within the boll, which is easily snapped from the plant by a smooth or slightly fluted roll. Any more aggressive roll would merely break off stems and leaves along with the bolls, requiring a more extensive cleaning operation later. However, in the case of open cotton, the lint hangs out of the boll and becomes more or less tangled with the twigs and leaves, thus requiring a roll having a somewhat more aggressive stripping action to pull or comb the loose lint out of the foliage. Hence it is desirable to harvest open cotton with rolls having rows of spaced fingers, even though these fingers may gather more leaves and other trash from the plants. The rolls used for harvesting stormproof cotton should have a few fingers near the upper end thereof for the purpose of clearing out any stalks or bunches of weeds that may be picked up by the stripper roll. These fingers also dislodge any occasional cotton bolls that are not stripped from the plants by the smooth or fluted portion of the roll. Thus, when the cotton harvester is moved from a field of one kind of cotton to a field of the other kind of cotton, it is necessary or highly desirable to change from one type of stripper roll to the other. Heretofore, it has been necessary to partially dismantle the machine in order to change the stripper rolls, with a consequent loss of time for making the conversion.

It is a further object of the present invention, therefore, to provide a stripper roll which can be easily and quickly converted from an aggressive roll having rows of stripper fingers extending substantially the entire length of the roll to a less aggressive roll having only a few stripper fingers near the upper end thereof.

These and other objects and advantages of our invention will be apparent to those skilled in the art after a consideration of the following description, in which reference is had to the drawings appended hereto, in which Figure 1 is a perspective view showing a stripper roll of the less aggressive type, embodying the principles of the present invention;

Figure 2 is a similar perspective view of a stripper roll of the more aggressive type;

Figure 3 is a perspective view, drawn to an enlarged scale, showing a portion of one of the stripper plates removed from the supporting shaft and looking toward the inner surface of the plate;

Figure 4 is a longitudinal sectional view, showing a portion of the roll illustrated in Figure 1;

Figure 5 is a transverse sectional view taken along a line 5—5 in Figure 4 and drawn to an enlarged scale; and Figure 6 is a transverse sectional view similar to Figure 5 but taken on a line 6—6 in Figure 4.

Referring now to the drawings and more particularly to Figures 1 and 3-6, inclusive, the stripper roll is indicated in its entirety by reference numeral 10 and comprises a supporting shaft 11 supported near its lower or forward end in a bearing 12 carried on a bracket 13. The upper or rear end of the shaft 11 is journaled in a bearing plate 14 which is mounted on a gear box 15, within which is disposed suitable gearing mechanism for driving the roll in a direction of rotation indicated by the arrows 16.

The details of the cotton harvester are not shown or described herein, for they do not constitute an essential part of the present invention and therefore any suitable conventional cotton stripper can be equipped with a roll of this kind, such as, for example, the harvester disclosed in a co-pending application, Serial No. 586,780, filed April 5, 1945, by M. W. Roscoe.

A tapered point member 17 is secured to the lower or forward end of the shaft 11 ahead of the supporting bearing 12, and is conventional in form.

The shaft 11 carries a plurality, in this case three, spiders 20, 21, 22 disposed in axially spaced relation and forming an elongated, skeletal core structure for the roll. Each of the spiders is preferably in the form of a disk having a central aperture 23 adapted to receive the shaft 11 and fit closely thereon, the periphery of each spider serving as mounting portions for plates to be presently described. The spiders are rigidly mounted on the shaft 11 and are adapted to rotate therewith.

The body of the roll 10 comprises a plurality of, preferably four, axially extending concavo-convex body elements in the form of plates 25, preferably formed as one-piece sheet metal members, arranged substantially parallel to the shaft 11 in peripherally spaced relation around the latter and supported on the spiders 20, 22 at opposite ends, thereof, respectively, and on the center spider 21 intermediate their ends. Each of the plates 25 is disposed with its convex surface 26 facing outwardly.

Each of the plates 25 is also provided with a depressed portion or area 30 in register with each of the spiders, each depressed area being apertured at 31 to receive a securing bolt 32, which has an enlarged head 33 adapted to seat or be received within the depressed portion 30 so that the head 33 is recessed and substantially flush with the outer convex surface 26 of the segmental plate 25. The bolts 32 are threadedly engaged in radially extending threaded passages 34 in the spiders 21, thus providing a plurality of individual securing means for the plates. When the bolts are tight, the plates 25 are rigidly secured to the spiders but are spaced outwardly of the latter because of the spacer means established by the inwardly depressed areas 30 around the bolts 32, which bear against the outer surfaces of the spiders 21.

The leading longitudinal edge 35 of each of the plates 25 is bent sharply inwardly from the cylindrical outer surface 26, the edge extending under the adjacent trailing edge 36 of the neighboring or adjacent plate. This construction prevents any cotton or trash from being caught under the leading edges of the plates 25 during rotation of the roll.

The trailing edge 36 of each of the plates 25 is provided with crop-engaging means in the form of a row of tangentially extending, axially spaced fingers 40, which overlap the leading edge 35 and outer surface 26 of the adjacent plate. Each of the fingers 40 is generally spatulate and concavo-convex in shape, the outer surface 41 being convex, while the inner surface 42 is concave. The outer tips 43 of the fingers 40 are also curved downwardly toward the cylindrical outer surface 26 of the underlying adjacent plate, and are rounded off to eliminate any sharp corners.

Preferably, each of the plates 25 is formed with the fingers 40 integral therewith, by cutting the plate and fingers out of a single piece of metal and then bending or pressing the plate into the form described above, including the depressions 30 and the fingers 40.

In the embodiment shown in Figure 1, the rows of fingers 40 extend axially only about one-third of the distance between the bearings 12, 14, at the upper end of the roll. The remainder of the roll is substantially smooth, except for the four axially extending grooves 45 defined by the trailing edge 36 of each plate and the leading edge 35 of the adjacent plate. This provides a very gentle agitation of the crop plants as they are pulled downwardly past the rotating roll in operation, which is effective in stormproof cotton to dislodge the cotton bolls without tearing off many of the twigs and leaves. As the plant passes rearwardly to the upper portion of the roll which has the rows of fingers 40, the fingers provide a somewhat more aggressive action which tends to snap off any cotton bolls that may have resisted the action of the smoother portion of the roll. The fingers 40 also clear out any bunches of weeds or other trash which otherwise tend to merely hang over the roll at its upper end.

In the embodiment shown in Figure 2, however, the fingers 40 are provided in axially spaced tangentially extending relation along the trailing edges 36' of the detachable plate 25'. The greater number of fingers produces a more aggressive action against the cotton plants during the entire time that the latter are in contact with the stripper roll. This is necessary and desirable in harvesting open cotton, in order to extract the lint from the foliage of the plant.

When the machine is taken from one type of cotton to the other, it is desirable to convert the roll from the less aggressive type shown in Figure 1 to the more aggressive type shown in Figure 2. This is quickly and easily accomplished by removing the three bolts 33 from each of the plates 25, replacing the latter with the more aggressive plates 25' and securing them in operating position by replacing the bolts 33. Thus, a great deal of time and effort is saved over the old method of conversion, which required partial dismantling of the machine in order to remove the entire stripper roll and replace it with a more or less aggressive roll.

We claim:

1. A harvester roll of sectional construction, comprising: an elongated, skeletal core structure adapted for rotation about its principal axis and having external mounting portions disposed in axially and circumferentially spaced relation as respects a cylinder formed about said axis; a plurality of relatively thin elongated plates of uniform thickness, each of substantially arcuate section and having a concave inner surface and a convex outer surface, disposed lengthwise of and grouped about and surrounding the core structure with their concave inner surfaces embracing the mounting portions of the core structure, and with their convex outer surfaces related to form generally a cylindrical plate structure about the aforesaid axis of the core structure, each plate having opposite lengthwise edges, and the plates being arranged with one edge of each closely overlapping the proximate edge of a neighboring plate so that the core structure is substantially enclosed by the plates; and means individually securing each plate to certain of the mounting portions of the core structure.

2. The invention defined in claim 1, further characterized in that: the core structure includes a central shaft, and a plurality of spiders carried on and axially spaced along the shaft; and said spiders have peripheral portions providing the aforesaid mounting portions and serving to mount the plates.

3. The invention defined in claim 1, further characterized in that: each plate is a one-piece sheet metal member having depressed portions spaced lengthwise thereof and projecting radially inwardly as respects the aforesaid axis of the core structure to provide a plurality of spacer means on the concave surface of the plate to respectively engage the mounting portions of the core structure for spacing the plates radially outwardly of said mounting portions, and further providing a plurality of corresponding recesses in the convex outer surface of the plate; and the securing means for the plates have outer portions respectively received in the recesses and inner portions respectively received in the mounting portions.

4. The invention defined in claim 1, further characterized in that: at least one of the plates has its overlapping edge formed with a plurality of generally tangentially extending, generally spatulate crop-engaging elements spaced lengthwise of the plate, each element having an outer, convex crop-engaging surface.

5. The invention defined in claim 1, further characterized in that: at least one of the plates has its overlapping edge continued generally tangentially over the overlapped neighboring plate to provide crop-engaging means.

6. The invention defined in claim 5, further characterized in that: the crop-engaging element comprises a plurality of finger portions extending tangentially as aforesaid and spaced apart lengthwise of said one plate.

7. The invention defined in claim 6, further characterized in that: said fingers are grouped together and confined within less than half the length of said one plate, and the remainder of the length of said edge of said one plate is fingerless.

8. A harvester roll plate of the character described, comprising: an elongated, relatively narrow member of arcuate cross-section having a convex outer surface and further having opposite lengthwise edges, one of said edges being extended generally tangentially of the outer convex surface at spaced apart portions lengthwise of the member to provide a plurality of generally spatulate crop-engaging fingers.

9. The invention defined in claim 8, further characterized in that: the generally tangentially extending fingers are grouped together and confined to substantially less than one-half the length of the member, and the remainder of the length of said one edge is fingerless.

10. The invention defined in claim 8, further characterized in that: the member is a single piece of sheet metal, and each finger is integral therewith and has an outer, convex crop-engaging surface.

LEONARD B. NEIGHBOUR.
MERRILL W. ROSCOE.

REFERENCES CITED

The following references are of record in the file of this patent:

UNITED STATES PATENTS

| Number | Name | Date |
|---|---|---|
| 16,008 | Gerrish | Nov. 4, 1856 |
| 872,821 | Johnson | Dec. 3, 1907 |
| 914,465 | Stone | Mar. 9, 1909 |
| 1,237,832 | Smith | Aug. 21, 1917 |
| 1,283,721 | Galbraith | Nov. 5, 1918 |
| 2,001,079 | Court | May 14, 1935 |
| 2,406,058 | Boone | Aug. 20, 1946 |